Dec. 15, 1959　　　J. J. GROSSMAN　　　2,917,728
TELEMETRY SYSTEM
Filed March 10, 1958　　　　　　　　5 Sheets-Sheet 1
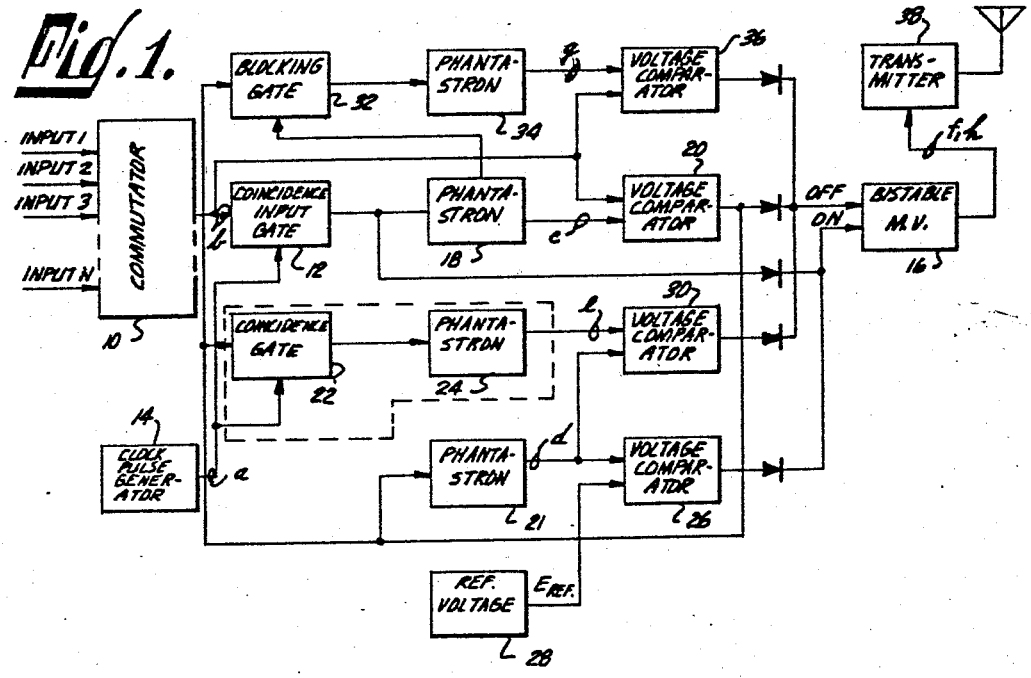
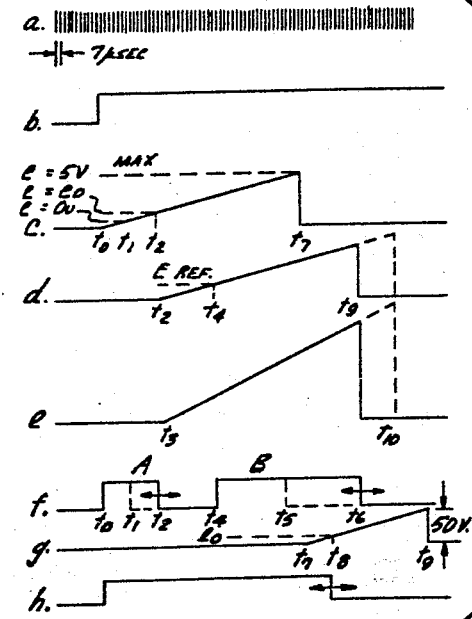
INVENTOR.
JACK J. GROSSMAN
BY
*Christie, Parker & Hale*
ATTORNEYS Dec. 15, 1959     J. J. GROSSMAN     2,917,728
TELEMETRY SYSTEM Filed March 10, 1958     5 Sheets-Sheet 2

INVENTOR.
JACK J. GROSSMAN
BY
Christie, Parker & Hale
ATTORNEYS

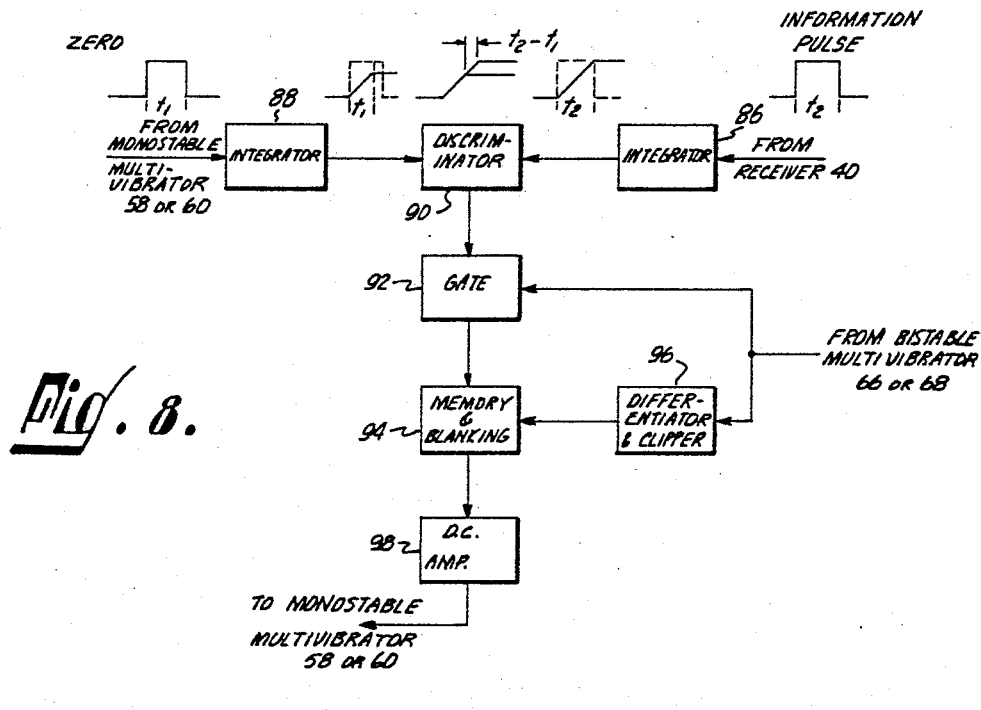
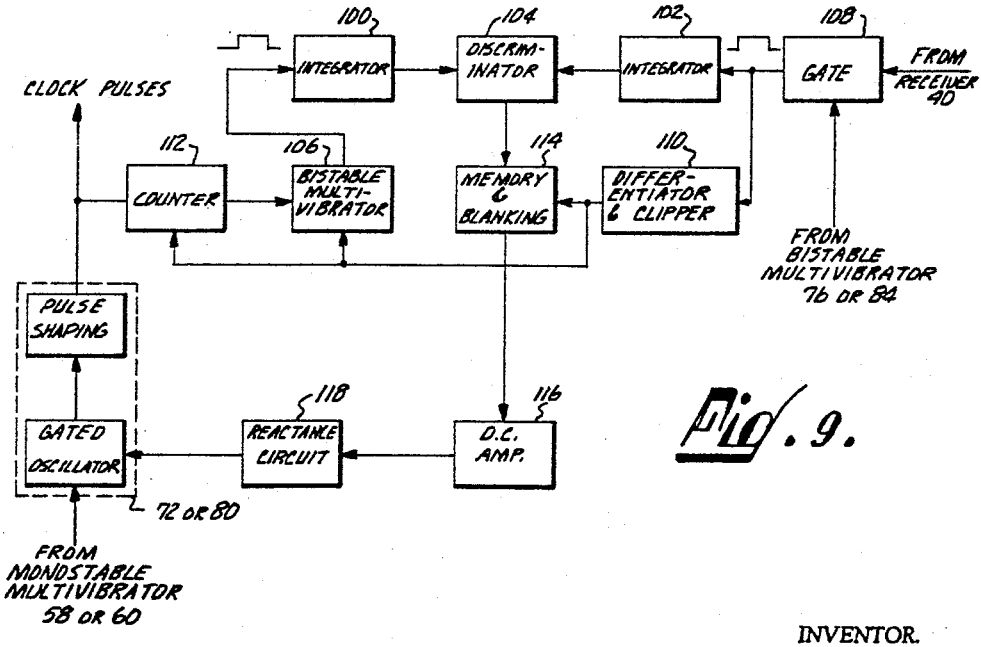

United States Patent Office 2,917,728
Patented Dec. 15, 1959

2,917,728

TELEMETRY SYSTEM

Jack J. Grossman, Covina, Calif., assignor to The Ralph M. Parsons Company, Los Angeles, Calif., a corporation of California Application March 10, 1958, Serial No. 720,490

10 Claims. (Cl. 340—203)

This invention relates to high-precision telemetry systems, and more particularly, is concerned with a telemetry system using pulse-duration modulation.

The use of pulse-duration modulation (PDM) in transmitting analog intelligence is well known. In such a system, a measured D.C. potential is converted to a linear time base. A telemetry system using successive PDM pulses, by suitable commutating means, may be used to represent a plurality of different input voltages. The accuracy to which the analog information can be reproduced at a remote station depends in part upon the linearity of the converter in changing the input voltage level to a time base, and also in part on the accuracy of transmission, reception, and readout. As in any transmission system, band width and signal-to-noise ratio of the system are important in the ultimate accuracy obtained in the transmission and reception of information. Practical considerations generally impose limtations on these latter two factors.

The present invention provides a PDM transmission system that achieves greater bandwidth utilization than the conventional system outlined above. As a result, the overall accuracy can be improved over the prior PDM systems, even with a reduced signal-to-noise ratio in the transmitter-receiver link. This improved bandwidth utilization is achieved by dividing each PDM channel into two or more sub-channels. Thus each analog voltage signal is transmitted as two or more pulses of variable duration within the time interval normally allotted for one channel in the conventional single-pulse PDM system.

In brief, the invention provides, at the transmitter, a clock pulse source and means synchronized with the clock pulse source, such as a phantastron delay circuit, for converting a D.C. voltage input signal to a linear time base. Thus a first output pulse, referred to as the A-channel pulse, is formed starting with an initial clock pulse and terminating at time fixed by the level of the input signal. Means responsive to the time interval between the termination of the first pulse and next occurring clock pulse generates a second output pulse, the start of which is delayed a fixed interval following the end of the first output pulse. The second output pulse, referred to as the B-channel pulse, is terminated an interval of time later determined by the interval between the end of the first output pulse and the next occurring clock pulse. This is accomplished by two phantastrons of different output voltage rise rates. The two phantastrons are triggered respectively by the termination of the first output pulse and the next occurring clock pulse. The instant when the rising voltages reach a predetermined amplitude relationship determines the time at which the second output pulse is terminated.

The advantage of the double-channel transmitting arrangement described in brief above, which forms the basis of the present invention, can best be understood by considering the following example. Assume that a full-scale D.C. input voltage is divided into fifty divisions and each division is subdivided into one hundred subdivisions. Assume the measured number is, for example, 4382. If this number is measured as 43 main divisions at a difference $^{82}/_{100}$ of a main division from the 43rd main division, the number can be transmitted in two parts. If the number 43 is transmitted with an accuracy of ±½ division, equal to 1%, it can be recovered at the receiver with zero error, i.e., 4300. If the difference 82 is transmitted with a 1% accuracy also, it can be received as 82±1. The number may be recombined at the receiver to give 4382±1, or ±0.02%. Thus the intelligence can be transmitted to a net precision of 0.02% with two signals which are only 1% accurate.

For a more complete understanding of the invention, reference should be had to the accompanying drawings, wherein:

Fig. 1 is a block diagram of the transmitting station;

Fig. 2 is a series of waveforms used in explaining the operation of the circuit of Fig. 1;

Fig. 8 is a block diagram of a zero servo; and

Fig. 9 is a block diagram of a clock servo.

Figure 3:
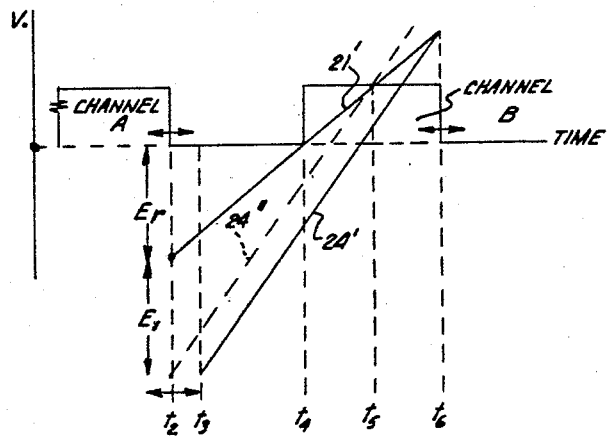
Fig. 3 is a diagram used in explaining the operation of the pulse-expansion circuit for the B-channel pulse transmission.

Referring to Fig. 1 in detail, the numeral 10 indicates suitable commutating means which successively connects a plurality of D.C. analog signals, represented by the inputs 1 to N, through a coincidence input gate 12 to which is coupled a suitable clock pulse generator 14. The generator 14 may be of any suitable type, such as a crystal-controlled oscillator with pulse shaping networks, for generating sharp pulses at 7 microsecond intervals, for example, as shown in Fig. 2a. The coincidence input gate 12 is a conventional gate circuit which is arranged to pass pulses from the generator 14 when it is biased open by the presence of an output signal, as shown in Fig. 2b, from the commutator 10.

The initial clock pulse from the generator 14 that is passed by the coincidence gate 12 triggers on a bistable multivibrator 16, initiating the start of an A-channel pulse at time $t_0$, as shown in Fig. 2f. At the same time, the initial pulse passed by the gate 12 triggers a phantastron 18 which generates a sawtooth wave output. The phantastron circuit, which may be of the type described in "Principles of Radar," M.I.T. Radar School Staff, 3rd edition, McGraw-Hill Publishing Co., 1952, pages 104–110, produces an output voltage which rises linearly with time, as shown in Fig. 2c.

The output of the phantastron 18, together with the input signal $e_0$ derived from the commutator 10, is applied to a voltage-comparator circuit 20 which is arranged to produce an output pulse when the level of the signal derived from the phantastron rises to the level of the input signal, which occurs at time $t_2$ as shown in Fig. 2c. The voltage comparator is biased such that the phantastron sawtooth wave is equal to a zero input signal at a time $t_1$. The time interval between $t_0$ and $t_1$, when the output of the phantastron reaches a zero input level, is set to be equal to 12 clock-pulse intervals or 84 microseconds. This interval determines the minimum pulse duration time, representing an input signal of zero volts.

The output pulse from the voltage comparator circuit 20 is used to trigger off the bistable multivibrator 16 thereby terminating the variable duration A-channel pulse at time $t_2$. It will be seen that, depending upon the level of the input signal, the duration of the A-channel pulse is varied from a minimum of 84 microseconds through a maximum determined by the level at which the output of the phantastron cuts off.

The phantastron 18 is preferably arranged to rise to a maximum of 5 volts, for example, and then return to its initial state. The rate of rise of the output voltage from the phantastron is arranged by way of example, such that the maximum 5 volt level is reached in a period of time corresponding to 308 microseconds or 44 clock-pulse intervals.

Assuming that the input signal from the commutator 10 is less than 5 volts, the output pulse resulting from the voltage comparator 20, in addition to being coupled to the bistable multivibrator 16, is coupled to a coincidence gate 22. The gate 22 is biased open in response to the output of the voltage comparator 20 for a sufficient length of time to pass the next clock pulse from the generator 14, which occurs at time $t_3$.

The output pulse from the voltage comparator 20, which occurs at time $t_2$, also triggers on a phantastron circuit 21. The next clock pulse, occurring at time $t_3$ and passed by the gate 22, triggers another phantastron circuit 24. The phantastron circuit 24 is arranged to have a faster rise rate than the output of the phantastron 21. The output waveforms of the two phantastrons 21 and 24 are shown in Figs. 2d and 2e respectively.

The output from the phantastron 21 is applied to a voltage comparator circuit 26 along with a fixed reference voltage from a bias source 28. The voltage comparator circuit 26 is arranged to produce an output pulse when the output of the phantastron 21 rises to the level of the reference voltage source 28. This corresponds to a time $t_4$. The output from the comparator 26 is coupled to the multivibrator 16 to trigger it on, thereby initiating the B-channel pulse as shown in Fig. 2f.

The output of the two phantastrons 21 and 24 are applied to a voltage comparator circuit 30 which generates an output pulse at the time the output level of the phantastron 24 equals the output level of the phantastron 21. The phantastrons 21 and 24 are biased to different initial output voltage levels such that if they are triggered simultaneously, the phantastron 24 with its faster rise rate will reach the level of the output of the phantastron 20 in a fixed time interval at time $t_5$, corresponding to 84 microseconds or 12 clock-pulse intervals following the start of the B-channel pulse at time $t_4$. This represents a zero condition for the B-channel pulse. The output of the voltage comparator 30, corresponding to time $t_6$, triggers off the bistable multivibrator 16 thereby terminating the B-channel pulse.

For a better understanding of the manner in which the B-channel pulse is generated, reference should be had to the diagram in Fig. 3 which shows a plot of voltage as a function of time. At the end of the A-channel pulse at time $t_2$, the phantastron 21 is triggered, generating an output voltage having a sawtooth waveform as indicated at 21' in Fig. 3. If the reference voltage source 28 is considered as being at zero volts, the phantastron 21 is biased negatively by an amount $E_r$ below the reference level. The slope of the output voltage is such that at time $t_4$ the output of the phantastron 21 rises to zero volts corresponding to the reference voltage level, at which time the voltage comparator circuit 26 generates a pulse which initiates the start of the B-channel pulse.

At some time following the end of the A-channel pulse at time $t_2$, a clock pulse is passed by the gate 22 at time $t_3$. The time interval between $t_2$ and $t_3$ is determined by the input voltage level of the signal derived from the commutator 10, since this voltage level determines the time $t_2$ at which the A channel pulse is terminated. The clock pulse passed by the gate 22 triggers the phantastron 24 and initiates a sawtooth output voltage, as indicated at 24' in Fig. 3.

In order to provide for a minimum pulse width in the B-channel, corresponding to a zero time interval between the times $t_2$ and $t_3$, the phantastron 24 is biased negative with respect to the phantastron 20 by an amount $E_1$ such that with the unequal slopes of the output signals from the phantastrons 21 and 24, they reach equality so as to trigger the comparator 30 at time $t_5$. This minimum B-channel pulse condition is illustrated by the dash lines 24" corresponding to the output wave form of the phantastron 24, assuming it is triggered at time $t_2$.

With the phantastron 24 triggered at time $t_3$ as shown, the output of the two phantastrons reach equal levels at time $t_6$, thus producing an output pulse from the comparator 30 which triggers off the bistable multivibrator 16 and terminates the B-channel pulse. The slopes of the output voltages of the two phantastrons and the relative bias voltage $E_1$ are arranged such that with the time interval between $t_2$ and $t_3$ at a maximum, corresponding to one clock pulse time interval, time $t_6$ occurs 308 microseconds or 44 clock pulse times following the start of the B-channel pulse at time $t_4$.

Thus it will be appreciated that for an input signal of less than 5 volts, two pulses are generated in channels A and B respectively which are separated by a fixed time interval of 84 microseconds. The B-channel pulse is an expansion of the difference between the time duration of the A-channel pulse and an integral number of clock pulses. By the arrangement described, the time interval $t_6 - t_5$ is made proportional to the time interval $t_3 - t_2$, the ratio or magnification factor being a function of the slope of the phantastron 24.

In order to transmit signals that may exceed the 5-volt input level, which level represents the maximum pulse width of both the A and B channels, means is provided for sending only the A-channel pulse. To this end, the phantastron 18 is arranged to automatically return to its quiescent condition when the output has risen to a 5-volt level. A pulse is generated by the phantastron circuit 18 when it returns to its quiescent condition, the pulse being applied to a blocking gate circuit 32. The gate circuit 32 is arranged to normally pass the pulse generated by the phantastron 18 to the input of another phantastron circuit 34. Thus the phantastron circuit 34 is triggered on at time $t_7$ corresponding to the time interval it takes the output of the phantastron 18 to rise to the 5-volt level. The output of the phantastron 34 rises linearly to a level of 50 volts at time $t_g$ in 392 usec.

The output of the phantastron circuit 34, waveform of which is shown in Fig. 2g, is compared to the input voltage $e_0$ as derived from the commutator 10 by a voltage comparator circuit 36, which is similar to the voltage comparator circuit 20 described above. When the voltage from the phantastron circuit 34 rises to the level of the input signal $e_0$, a pulse is generated at the output of the comparator circuit 36 which is coupled to the bistable multivibrator 16, triggering off the multivibrator 16 at time $t_8$. Thus with an input voltage level over 5 volts, the bistable multivibrator 16 is triggered on at time $t_0$ and triggered off at time $t_8$, providing a single long pulse, as shown in Fig. 2h, instead of the two pulses otherwise generated when the input signal is less than 5 volts.

The blocking gate circuit 32 is arranged to be biased off for a fixed interval of time, for example 300 microseconds, in response to the output pulse from the voltage comparator 20. This may be accomplished by a monostable multivibrator as part of the blocking gate circuit 32 for biasing off the gate during the unstable period of the multivibrator, according to well known gating techniques. This insures that when the input signal $e_0$ is less than 5 volts, the pulse generated by the phantastron 18 and applied to the blocking gate circuit 32 will not be passed to trigger on the phantastron 34.

Figure 4:
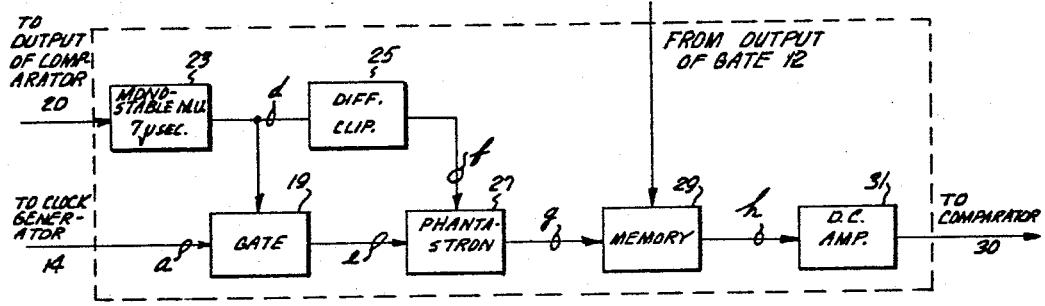
Fig. 4 is a modified B-channel pulse generator.

In Fig. 4 there is shown an alternative circuit arrangement for the B-channel pulse generating circuit included within the dash-line box of Fig. 1. It will be noted that in the description of the circuit of Fig. 1 that the interval between the end of the A-channel pulse and the next clock pulse was used to generate the B-channel pulse. This is somewhat disadvantageous in that this interval decreases with an increase of the input level, thus representing the complement of the desired information. Therefore it is preferable to be able to measure the interval from the preceding clock pulse to the end of the A-channel pulse, which interval increases with an increase in the level of the analog input. Moreover the circuit of Fig. 1 requires the comparison of two rising voltages of different slope. If the slope of these two voltages are not materially different, it is difficult to establish accurately the exact time at which the two voltages are equal. Obviously the more nearly equal the slopes of rising voltages are, the more difficult it is to determine the point of equality. The modified circuit avoids both these limitations attendant with the circuit of Fig. 1.

Figure 5:
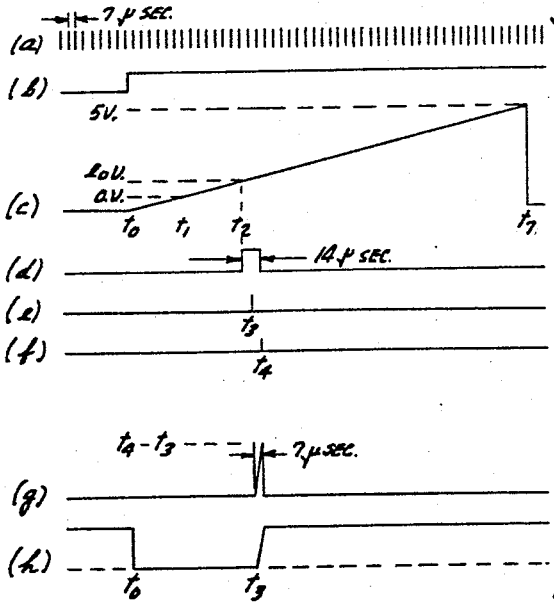
Fig. 5 is a series of waveforms produced by the circuit of Fig. 4.

The modified circuit of Fig. 4 includes a gate circuit 19 coupled to the output of the clock generator 14. The gate 19 is controlled by a monostable multivibrator 23 which has a recovery time of 7 microseconds, i.e., a recovery time equal to the interval between two clock pulses. The monostable multivibrator 23 is triggered in response to an output pulse at time $t_2$, as derived from the output of the comparator 20 in the circuit of Fig. 1. Thus at time $t_2$, corresponding to the end of the A-channel pulse, as shown in Fig. 2f, the gate 19 is biased open for 7 microseconds. The output waveform of the monostable multivibrator 23 is shown in Fig. 5d. It will be noted that Figs. 5a, b, and c are the same as Figs. 2a, b, and c, repeated to show the time relation to the generation of the A-channel pulse.

The next clock pulse to occur following the end of the A-channel pulse at time $t_2$ is passed by the gate 19 at time $t_3$ to a phantastron circuit 27. The phantastron 27 is triggered on at time $t_3$ by the output of the gate 19, generating a rising voltage at the output thereof, as indicated by the waveform of Fig. 5g. The phantastron 27 is triggered off by a pulse derived from the trailing edge of the output pulse of the multivibrator 23 by means of a differentiating and clipping circuit 25. This pulse, occurring at time $t_4$, is shown in the waveform of Fig. 5f. Thus the level to which the output of the phantastron 27 rises is determined by the interval between the clock pulse occurring at time $t_3$ and the delayed pulse occurring exactly 7 microseconds after the end of the A-channel pulse at time $t_2$, namely, the pulse at time $t_4$.

A memory circuit 29 coupled to the output of the phantastron 27 provides a capacitor storage circuit which is charged up to the peak level of the output of the phantastron 27. The memory circuit 29 stores this peak level until it is discharged in response to the output of the coincidence gate 12 of Fig. 1, namely, at the start of the A-channel pulse. This level is amplified by a predetermined amount in a D.C. amplifier 31 and applied to the comparator 30 of Fig. 1. Thus the comparator 30 generates an output pulse, marking the end of the B-channel pulse, at a time determined by the level at the output of the D.C. amplifier 31. The expansion factor between the time interval $t_4 - t_3$ and the duration of the B-channel pulse is determined by the slope of the phantastron 20, and the slope of the phantastron 27, and the gain of the D.C. amplifier 31.

From the description of the transmitter circuit of Fig. 1 as above described or as modified by the circuit of Fig. 4, it will be appreciated that for input voltage levels of less than 5 volts, two such channels of variable pulse duration are transmitted. With an input over 5 volts, a single pulse having pulse-duration modulation is provided.

The output from the bistable multivibrator is coupled to the modulation input of suitable transmitter means 38 for transmission to a remote receiving station.

Preferably the inputs 1 and 2 to the commutator 10 are arranged to provide a zero input level and a 5 volt input level respectively, so that the first two groups of pulses transmitted provide means for calibrating zero and full scale at the receiving station. The commutator 10 is arranged to successively sample a plurality of inputs, providing a delay between each recycling of the input sampling process. This delay is utilized at the receiving station to identify completion of a sampling cycle, referred to as a frame, so as to synchronize the receiving station output information with the inputs being sampled at the transmitting station.

Figure 6:
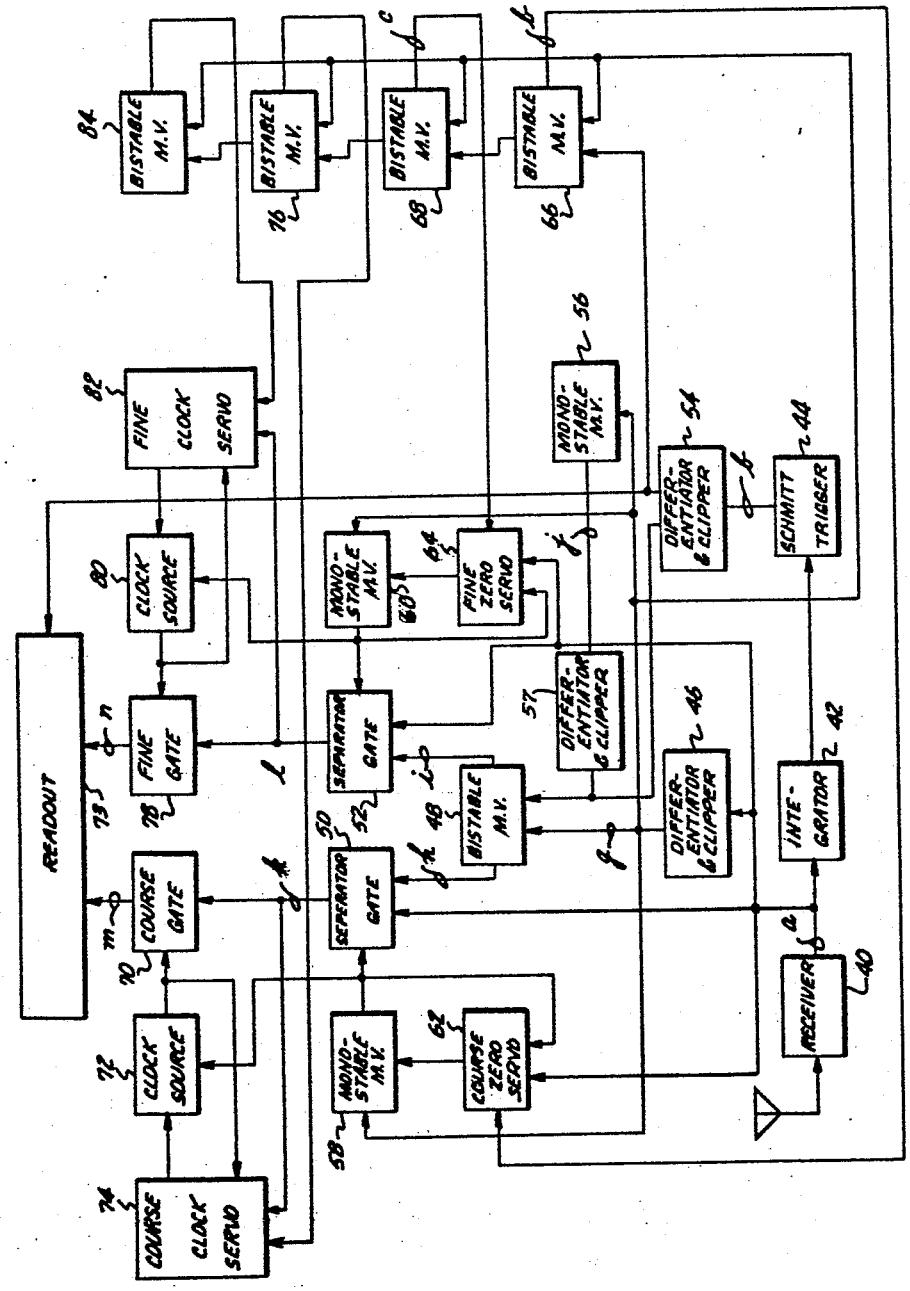
Fig. 6 is a block diagram of the receiving station.

Operation of the receiving station can best be understood by the block diagram of Fig. 6.

Figure 7:
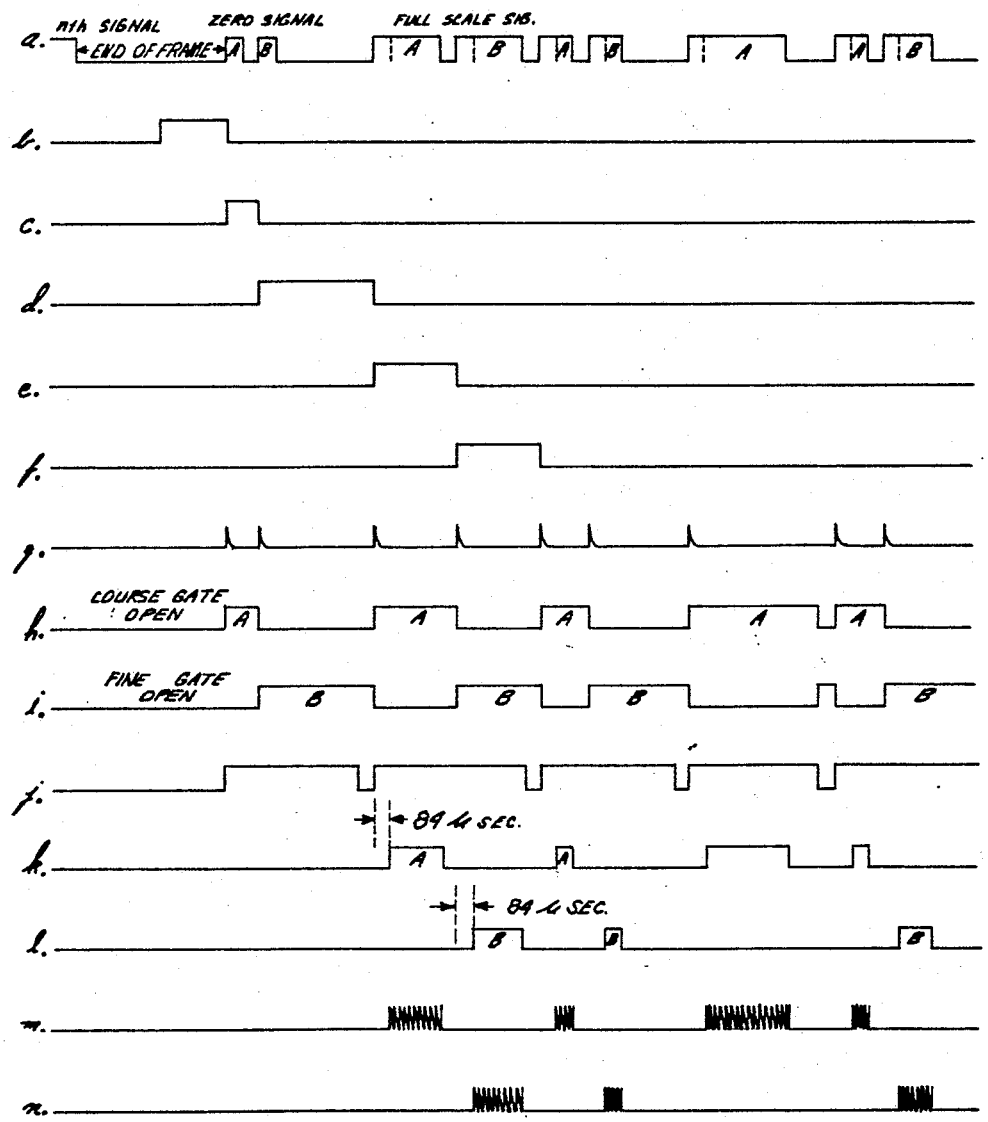
Fig. 7 is a series of waveforms used in explaining the operation of the receiving circuit of Fig. 6.

The receiving station includes a suitable receiver 40 for receiving and demodulating the transmitted signal. The output of the receiver 40 has substantially the same pulse waveforms as the output signals from the bistable multivibrator 16 at the transmitting station. The waveform in Fig. 7a is a typical signal for the output of the receiver 40.

The output from the receiver 40 is applied to an integrator circuit 42 for controlling a Schmidt trigger circuit 44. The time response to the integrator 42 is such that information pulses occurring at the normal commutating rate maintain the output of the integrator at a high level. As a result, the Schmidt trigger circuit 44 remains in one of its two stable conditions. However, in the interval between frames during which an extended interval occurs between pulse signals, the output of the integrator 42 drops sufficiently to set the Schmidt trigger circuit 44 to its other bistable condition. The output waveform of the Schmidt trigger 44 is shown in Fig. 7b. It will be seen that the Schmidt trigger produces a rectangular pulse identifying the end of one frame and the start of the next frame of a group of information pulses.

The output of the receiver 40 is also applied to a differentiating and clipping circuit 46 for deriving pulses corresponding to the leading edge on each of the variable duration information pulses from the output of the receiver 40. The output of the differentiating and clipping circuit 46 is shown in Fig. 7g. These pulses are used to alternately trigger a bistable multivibrator 48 from one stable condition to another.

The bistable multivibrator 48 controls a coarse separation gate 50 and a fine separation gate 52, the two gates being alternately gated open by the triggering of the bistable multivibrator 48. The output from the receiver 40 is applied to both the coarse separation gate 50 and the fine separation gate 52. By properly controlling the multivibrator 48, as hereinafter more fully described, the A-channel pulses are gated by the coarse separation gate 50 and B-channel pulses are gated by the fine separation gate 52.

The bistable multivibrator 48 is originally set so as to gate off the coarse separation gate 50. This is done by means of a differentiating and clipping circuit 54 coupled to the output of the Schmidt trigger by means of which a pulse is derived corresponding to the leading edge of the long pulse generated by the Schmidt trigger 44. Thus at the start of a frame, the bistable multivibrator 48 is set so as to be triggered by the first pulse in the next frame from the receiver 40 to gate on the coarse separation gate 50. Thereafter, assuming each pair of pulses from the receiver 40 is an A-channel pulse and a B-channel pulse, the gates 50 and 52 act to separately gate out A-channel and B-channel pulses from the receiver 40.

In the event no B-channel pulse is received, such as where the A-channel pulse indicates a voltage over the 5 volt level, a monostable multivibrator 56 resets the bistable multivibrator 48 after a period of time in excess of the length of a pulse corresponding to the maximum 50 volt signal level, e.g., after a thousand microseconds; see Fig. 7j. Suitable differentiating and clipping means 57 is provided at the output of the monostable multivibrator circuit 56 in order to generate a resetting pulse for the multivibrator 48 at the end of the 1000 microsecond interval.

Since the information pulses as derived from the receiver 40 include a zero time interval of 84 microseconds corresponding to the minimum pulse width, it is desirable to subtract this time interval from the total time interval of the information pulses. This is accomplished by means of monostable multivibrators 58 and 60 coupled to the separation gates 50 and 52 respectively. Multivibrators 58 and 60 have a nominal recovery time of 84 microseconds and are arranged to gate off the respective gates 50 and 52 during this interval. The multivibrators 58 and 60 are triggered by the pulses from the differentiating and clipping circuit 46 corresponding to the leading edges of the information pulses. Thus following the start of each of the information pulses, the monostable multivibrators 58 and 60 insure that the gates 50 and 52 respectively cannot be gated on for a delay period of 84 microseconds. The actual delay time produced by the monostable multivibrators 58 and 60 is controlled by coarse and fine zero servos 62 and 64 respectively in response to the zero reference pulses sent at the beginning of each frame by the transmitting station. The operation of the servos 62 and 64 will hereinafter be more fully explained in connection with Fig. 8.

Operation of the coarse zero servo 62 is controlled by a bistable multivibrator 66 which is initially triggered in response to the trailing edge of the pulse from the Schmidt trigger 44. Triggering of the bistable multivibrator 66 activates the coarse zero servo 62. The multivibrator 66 is reset by the leading edge of the next information pulse in response to the output of the differentiating clipping circuit 46. Thus it will be seen that multivibrator 66 renders the coarse zero servo 62 operative during the time the first coarse zero reference pulse is received at the start of a frame, as shown by the waveform of Fig. 7b.

Resetting of the bistable multivibrator 66 actuates a second bistable multivibrator 68 which causes the fine zero servo 64 to be activated. The bistable multivibrator 68 in turn is triggered off again by the next pulse from the differentiating and clipping circuit 46, corresponding to the leading edge of the coarse full scale pulse from the receiver 40. The waveform is shown in Fig. 7c.

The resulting output from the coarse separation gate 50 is shown in Fig. 7k, and is a series of pulses corresponding to the A-channel pulses less the zero signal interval as derived from the receiver 40. The output from the fine separation gate 52 has a waveform such as shown in Fig. 7l and comprises pulses corresponding to the B-channel pulses from the receiver 40 less the zero signal time interval.

The coarse separation gate 50 output is used to gate on a coarse gate circuit 70 which in turn is coupled to the output of a gated clock source 72. The clock source 72 is gated on by the monostable multivibrator 58 at the end of its 84 microsecond delay interval. Thus the coarse gate 70 passes a plurality of clock pulses from the source 72, the number being determined by the time interval the coarse gate 70 is open, which in turn depends upon the duration of the A-channel pulse from the receiver 40 as it is received from the transmitting station. The clock pulses gated by the coarse gate circuit 70 are passed to suitable readout means 73 for deriving a count proportional to the number of clock pulses and/or recording the information in suitable digital or analog form as required.

The frequency of the clock source 72 is controlled by a coarse clock servo 74 which will hereinafter be more fully described in connection with Fig. 9. The servo adjusts the clock source so as to generate a predetermined number of clock pulses during a full-scale time interval, i.e., 5-volt input level, of the A-channel pulse. To this end the coarse clock servo is activated by a bistable multivibrator 76 following the resetting of the bistable multivibrator 68. Thus the bistable multivibrator 76 is actuated in response to the third information pulse following the start of the frame, which pulse corresponds to a full scale A-channel signal. The bistable multivibrator 76 is reset by the next pulse from the differentiating and clipping circuit 46, corresponding to the start of the fourth information pulse from the receiver 40 following the start of a new frame, as shown by the waveform of Fig. 7d. The output of the coarse gate 70 is shown in Fig. 7m.

Similarly, the output of the fine separation gate 50 is coupled to a fine gate 78 by means of which clock pulses from a gated clock source 80 are coupled to the readout means 73. The clock source 80 is gated on by the monostable multivibrator 60 at the end of its delay period. The frequency of the gated clock source 80 is controlled by a fine clock servo 82 which is activated in response to a bistable multivibrator 84. Fig. 7n shows the output of the fine gate 78.

The multivibrator 84 is triggered on by the resetting of the multivibrator 76, corresponding in time to the start of the fourth information pulse following the start of a new frame. The bistable multivibrator 84 in turn is reset by the next pulse from the output of the differentiating and clipping circuit 46, corresponding to the start of the fifth information pulse from the receiver 40 following the start of a new frame. The output waveform is shown in Fig. 7e.

The frequency of the clock source 80 is adjusted by the servo to produce a predetermined number of pulses during the time interval corresponding to full-scale of the B-channel. Thus coarse and fine digital information accurately controlled in response to the A-channel and B-channel pulses from the transmitting station are fed to the readout means 73. It is also desirable to feed the output from the differentiating and clipping circuit 54 associated with the Schmidt trigger 44 to the readout means 73 whereby the end of information frames may be established.

It is believed that from the above description, a person skilled in the art can readily build and operate telemetering equipment utilizing applicant's invention. All of the circuits in the blocks described above are generally known or can be constructed along the lines of well known principles of operation. For the sake of completeness, certain of the block circuits will be described in more detail by way of example.

In the transmitting circuit, the commutator circuit need not be described in more detail except to state that it should be capable of commutating with low noise levels at a rate of 50,000 commutations per minute. Likewise the clock pulse generator 14 is of conventional design and may be crystal-controlled with suitable pulse shaping circuits in the output to derive sharp pulses at the desired 7 microsecond intervals. Coincidence gates 12 and 22 may be of any well known type of circuit which produces an output pulse in response to coincidence of two input pulses. Suitable coincidence gate circuits are described in the book entitled, "Waveforms" which is vol. 19 of the Radiation Laboratory Series, McGraw-Hill, 1949, chapter 10. The bistable multivibrator 16 is a conventional Eccles Jordan circuit and need not be described in more detail here.

Suitable comparator circuits which may be used for the voltage comparator circuits 20, 26, 30 and 36 are described in the abovementioned book entitled, "Waveforms," chapter 9.

In the receiver, the only circuits which are not standard type circuits are the servos, i.e., the coarse and fine zero servos 62 and 64, and the coarse and fine clock servos 74 and 82. As shown in Fig. 8, the zero servo includes an integrating circuit 86 to which the output of the receiver 40 is coupled. The output of the integrator circuit is a voltage that rises during the duration of the pulse. Thus the output level at the output of the integrator depends upon the duration of the pulse input. Similarly the output of the 84 microsecond monostable multivibrator being controlled by the servo is applied to an integrating circuit 88 which also produces a rising voltage during the duration of the input pulse. Any difference in the duration of the pulses applied to the integrator 88 and the integrator 86 results in a different level being applied to a discriminator circuit 90 at the end of the two input pulses, as indicated by the waveform directly above the discriminator block 90 in Fig. 8.

The discriminator circuit 90 may be a simple differential amplifier which produces an output whose magnitude is a function of the difference in levels of the output of the integrators 86 and 88. If there is no difference, of course, the output of the discriminator 90 is zero.

The output of the discriminator 90 is coupled by means of a gate circuit 92 to a memory and blanking circuit 94. The gate circuit 92 is operated by the controlling bistable multivibrator, which in the case of the coarse zero servo is the multivibrator 66 of Fig. 6, and in the case of the fine zero servo is the multivibrator 68 of Fig. 6. The memory circuit 94 consists of a storage capacitor which is charged to the potential of the output of the discriminator 90 when the gate 92 is open. Means is provided for discharging the capacitor in response to a pulse derived from the leading edge of the gating pulse from the bistable multivibrator by means of a differentiating and clipping circuit 96. In this way, the memory circuit 94 is discharged at the time the gate 92 is initially opened so as to permit it to be recharged to the new level produced at the output of the discriminator 90.

The potential level produced at the output of the discriminator due to the difference in time duration of the two integrated pulses applied thereto is stored in the storage capacitor of the memory circuit 94 and is amplified by a predetermined amount by means of a suitable D.C. amplifier 98. The output of the amplifier 98 is applied to the associated monostable multivibrator for establishing the reset time of the multivibrator. In this manner the servo operates to adjust the multivibrator to have a reset period corresponding to the zero signal reference received from the transmitting station.

Similarly the coarse and fine clock servos 74 and 82, as shown in Fig. 9, include a pair of integrator circuits 100 and 102 applied to a discriminator 104. The output from the receiver 40 is applied to the integrator circuit 102. The integrator 100 integrates a square pulse generated by a bistable multivibrator 106. The bistable multivibrator 106 is triggered to one stable condition, to start the square pulse applied to the integrator, by the leading edge of the information pulse derived from the receiver 40 through the gate 108. A differentiating and clipping circuit 110 derives a sharp pulse from the leading edge of the information pulse from the receiver 40 for triggering on the multivibrator 106. The gate 108 is controlled by an appropriate one of the bistable multivibrators 76 or 84, depending upon whether it is the coarse or fine clock servo.

The output pulse from the differentiating and clipping circuit 110 resets a counter 112 which thereafter is counted up by pulses derived from the clock pulse source 72 or 80. After a predetermined number of pulses, e.g., 32, the counter 112 generates an output pulse which resets the bistable multivibrator 106. The discriminator 104, in the same manner as the discriminator 90 of the circuit described in connection with Fig. 8, produces an output signal whose magnitude is indicative of whether the multivibrator 106 is triggered off before or after the end of the full scale pulse derived from the receiver 40. The difference potential derived from the discriminator 104 is applied to a memory and blanking circuit 114, the potential being stored in a suitable storage capacitor which is initially discharged in response to a pulse from the differentiating and clipping circuit 110. The stored level is amplified by a suitable D.C. amplifier 116 and applied to the reactance tube circuit 118 by means of which the frequency of the oscillator and the clock source is controlled. Thus the servo of Fig. 9 acts to adjust the frequency of the clock source so as to produce an exact predetermined number of clock pulses during the full scale interval as set at the transmitting station.

From the above description it will be recognized that a telemetering system using pulse duration modulation is provided in which low level signals are transmitted in two sub-channels. The receiver separates the two sub-channels to provide fine and coarse information. By using double-pulse modulation as described, better utilization of bandwidth is achieved, providing greater accuracy. The servo controls in the receiver automatically correct for changes in the zero signal pulse duration, and automatically correct for slight variations in the multiplication factor in expanding the difference between the duration of the coarse signal pulse and the integral number of clock pulses at the transmitter.

While the preferred embodiment shows a system employing two sub-channels, it will be evident to one skilled in the art that more than two sub-channels could be employed under the principles of the invention.

What is claimed is:

1. Apparatus for relaying information in the form of voltage signals by radio link from a transmitting station to a receiving station comprising, at the transmitting station, means for periodically sampling the instantaneous voltage level of the information signals, means for periodically sampling a voltage corresponding to a zero level signal, means for periodically sampling a voltage corresponding to a full-scale level signal, a clock pulse source, means synchronized with the clock pulse source for generating a first rectangular pulse in response to each sampling by said sampling means having a duration proportional to the instantaneous magnitude of the sampled signal plus a fixed minimum time interval corresponding to a zero level signal, means responsive to the time interval between the termination of the first rectangular pulse and the next occurring clock pulse for generating a second rectangular pulse having a duration proportional to said last-mentioned time interval plus a fixed minimum time interval corresponding to a zero level signal, means for delaying the start of the second rectangular pulse a fixed time interval following the end of the first rectangular pulse, whereby the transmitting station transmits a pair of rectangular pulses of controlled duration for each periodic sampling by the sampling means; the apparatus further comprising, at the receiving station, means for separating the first and second rectangular pulses as received, means including a first servo control responsive to the first rectangular pulses corresponding to the sampling of the zero level signal at the transmitting station for generating first zero reference pulses in response to each of the received first rectangular pulses having a time duration equivalent to a zero level signal at the transmitting station, means including a second servo control responsive to the second rectangular pulses corresponding to the sampling of the zero reference signal at the transmitting station for generating second zero reference pulses in response to each of the received second rectangular pulses having a time duration equivalent to a zero level signal at the transmitting station, first and second clock pulse sources, means including a third servo control responsive to the first rectangular pulses corresponding to the sampling of the full-scale level signal at the transmitting station for adjusting the frequency of the first clock source to produce a predetermined number of clock pulses during the full scale time interval, means including a fourth servo control responsive to the second rectangular pulses corresponding to the sampling of the full-scale level signal at the transimtting station for adjusting the frequency of the second clock source to produce a predetermined number of clock pulses during the full-scale time interval, means for gating out clock pulses from the first clock source during the interval between the termination of each of the first zero reference pulses and the termination of the corresponding one of each of the received first rectangular pulses, and means for gating out clock pulses from the second clock source during the interval between the termination of each of the second zero reference pulses and the termination of the corresponding one of each of the received second rectangular pulses.

2. Apparatus for relaying information in the form of voltage signals by radio link from a transmitting station to a receiving station comprising, at the transmitting station, means for periodically sampling the instantaneous voltage level of the information signals, a clock pulse source, means synchronized with the clock pulse source for generating a first rectangular pulse in response to each sampling by said sampling means having a duration proportional to the instantaneous magnitude of the sampled signal plus a fixed minimum time interval corresponding to a zero level signal, means responsive to the time interval between the termination of the first rectangular pulse and the next occurring clock pulse for generating a second rectangular pulse having a duration proportional to said last-mentioned time interval plus a fixed minimum time interval corresponding to a zero level signal, means for delaying the start of the second rectangular pulse a fixed time interval following the end of the first rectangular pulse, whereby the transmitting station transmits a pair of rectangular pulses of controlled duration for each periodic sampling by the sampling means, the apparatus further comprising at the receiving station, means for separating the first and second rectangular pulses as received, means for generating first zero reference pulses in response to each of the received first rectangular pulses having a time duration equivalent to a zero level signal at the transmitting station, means for generating second zero reference pulses in response to each of the received second rectangular pulses having a time duration equivalent to a zero level signal at the transmitting station, first and second clock pulse sources, means for gating out clock pulses from the first clock source during the interval between the termination of each of the first zero reference pulses and the termination of the corresponding one of each of the received first rectangular pulses, and means for gating out clock pulses from the second clock source during the interval between the termination of each of the second zero reference pulses and the termination of the corresponding one of each of the received second rectangular pulses.

3. Apparatus for relaying information in the form of voltage signals by radio link from a transmitting station to a receiving station comprising, at the transmitting station, means for periodically sampling the instantaneous voltage level of the information signals, a clock pulse source, means synchronized with the clock pulse source for generating a first rectangular pulse in response to each sampling by said sampling means having a duration proportional to the instantaneous magnitude of the sampled signal plus a fixed minimum time interval corresponding to a zero level signal, means responsive to the time interval between the termination of the first rectangular pulse and the next occurring clock pulse for generating a second rectangular pulse having a duration proportional to said last-mentioned time interval plus a fixed minimum time interval corresponding to a zero level signal, means for delaying the start of the second rectangular pulse a fixed time interval following the end of the first rectangular pulse, whereby the transmitting station transmits a pair of rectangular pulses of controlled duration for each periodic sampling by the sampling means, the apparatus further comprising, at the receiving station, means for separating the first and second rectangular pulses as received, means for generating first zero reference pulses in response to each of the received first rectangular pulses having a time duration equivalent to a zero level signal at the transmitting station, means for generating second zero reference pulses in response to each of the received second rectangular pulses having a time duration equivalent to a zero level signal at the transmitting station, means for measuring and indicating the interval between the termination of each of the first zero reference pulses and the termination of the corresponding one of each of the received first rectangular pulses, and means for measuring and indicating the interval between the termination of each of the second zero reference pulses and the termination of the corresponding one of each of the received second rectangular pulses.

4. Telemetering apparatus for relaying information in the form of at least one input voltage comprising a clock pulse source, means for periodically sampling the amplitude of the input signal, means synchronized with an initial pulse from the clock source for generating a first pulse whose time duration is a function of the instantaneous amplitude of the input signal at the time of sampling by said sampling means, means responsive to the termination of said first pulse and the next successive clock pulse for generating a second pulse whose time duration is a function of the difference between the time duration of the first pulse and the closest integral number of clock pulse intervals, means for delaying the start of the second pulse a fixed time interval following the termination of the first pulse, whereby a pair of pulses of controlled duration are generated in response to each periodic sampling of the input voltage, means for transmitting said pairs of pulses to a remote receiver, means at the receiver for separating the first pulse from the second pulse of each received pair of pulses, and means for measuring and indicating the time duration of the respective separated pulses.

5. Apparatus for relaying information in the form of voltage signals by radio link from a transmitting station to a receiving station comprising, at the transmitting station, means for periodically sampling the instantaneous voltage level of the information signals, means for periodically sampling a voltage corresponding to a zero level signal, means for periodically sampling a voltage corresponding to a full-scale level signal, a clock pulse source, means synchronized with the clock pulse source for generating a first rectangular pulse in response to each sampling by said sampling means having a duration proportional to the instantaneous magnitude of the sampled signal plus a fixed minimum time interval corresponding to a zero level signal, means responsive to the time interval between the termination of the first rectangular pulse and the next occurring clock pulse for generating a second rectangular pulse having a duration proportional to said last-mentioned time interval plus a fixed minimum time interval corresponding to a zero level signal, means for delaying the start of the second rectangular pulse a fixed time interval following the end of the first rectangular pulse, whereby the transmitting station transmits a pair of rectangular pulses of controlled duration for each periodic sampling by the sampling means.

6. Apparatus for relaying information in the form of voltage signals by radio link from a transmitting station to a receiving station comprising, at the transmitting station, means for periodically sampling the instantaneous voltage level of the information signals, a clock pulse source, means synchronized with the clock pulse source for generating a first rectangular pulse in response to each sampling by said sampling means having a duration proportional to the instantaneous magnitude of the sampled signal plus a fixed minimum time interval corresponding to a zero level signal, means responsive to the time interval between the termination of the first rectangular pulse and the next occurring clock pulse for generating a second rectangular pulse having a duration proportional to said last-mentioned time interval plus a fixed minimum time interval corresponding to a zero level signal, means for delaying the start of the second rectangular pulse a fixed time interval following the end of the first rectangular pulse, whereby the transmitting station transmits a pair of rectangular pulses of controlled duration for each periodic sampling by the sampling means.

7. Apparatus for transmitting in pulse form analog input information in the form of a D.C. voltage level, comprising means for generating a plurality of clock pulses, means including a first saw-tooth generator triggered by the first of a selected group of clock pulses for generating a first delayed timing pulse a delayed interval following said first clock pulse as determined by the magnitude of input information voltage level, whereby the input information is converted to a time base measured by the first clock pulse and the first timing pulse, means responsive to the first timing pulse for generating a second timing pulse a fixed delay interval following the first timing pulse, and means including a second saw-tooth generator and a third saw-tooth generator having different voltage change rates triggered respectively by the first timing pulse and the next successive clock pulse following the second timing pulse, and means responsive to the relative amplitudes of the outputs of the second and third saw-tooth generators for generating a third timing pulse when the second and third saw-tooth generator outputs reach a fixed predetermined relative magnitude, whereby any fractional part of a clock pulse interval in the time base between the first clock pulse and the first timing pulse is converted to an expanded time base measured by the second and third timing pulses.

8. Apparatus as defined in claim 7 wherein the first saw-tooth generator means includes means for producing a pulse when the level of the saw-tooth voltage output reaches a fixed predetermined level, a fourth saw-tooth generator triggered on by said last-named pulse, and comparator means for producing a fourth timing pulse when the output of the fourth saw-tooth generator reaches the magnitude of input information voltage level, whereby the fourth timing pulse is generated when the input voltage level exceeds said fixed predetermined level.

9. Apparatus for transmitting analog information in the form of a D.C. voltage level in pulse form comprising means for generating a plurality of clock pulses, means responsive to a first one of a selected group of clock pulses for generating a first rectangular pulse having a duration proportional to the instantaneous magnitude of said D.C. voltage level plus a fixed time interval and means for generating a second rectangular pulse including means for delaying the start of said second pulse a fixed time interval following the termination of the first pulse, and means responsive to the time difference between the termination of said first rectangular pulse and the next occurring clock pulse of said selected group of clock pulses for terminating the second rectangular pulse after a time interval proportional to said time difference plus a fixed time interval.

10. Apparatus for transmitting analog information in the form of a D.C. voltage level in pulse form comprising means for generating a plurality of clock pulses, means responsive to a first one of a selected group of clock pulses for generating a first rectangular pulse having a duration related to the instantaneous magnitude of said D.C. voltage level and means for generating a second rectangular pulse including means for delaying the start of said second pulse a fixed time interval following the termination of the first pulse, and means responsive to the time difference between the termination of said first rectangular pulse and the next occurring clock pulse of said selected group of clock pulses for terminating the second rectangular pulse after a time interval related to said time difference.

References Cited in the file of this patent
UNITED STATES PATENTS

| | | |
|---|---|---|
| 2,578,643 | Hayslett | Dec. 11, 1951 |
| 2,717,370 | Piper | Sept. 6, 1955 |